United States Patent
Strobel

(10) Patent No.: US 10,677,878 B2
(45) Date of Patent: Jun. 9, 2020

(54) METHOD FOR DIRECTION FINDING AND DIRECTION FINDING ANTENNA UNIT

(71) Applicant: Rohde & Schwarz GmbH & Co. KG, Munich (DE)

(72) Inventor: Philipp Strobel, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 270 days.

(21) Appl. No.: 15/603,666

(22) Filed: May 24, 2017

(65) Prior Publication Data

US 2018/0052215 A1 Feb. 22, 2018

(30) Foreign Application Priority Data

Aug. 19, 2016 (EP) ..................................... 16184891

(51) Int. Cl.
| | | |
|---|---|---|
| *G01S 5/04* | (2006.01) | |
| *G01S 3/06* | (2006.01) | |
| *H01Q 3/36* | (2006.01) | |
| *G01S 3/04* | (2006.01) | |
| *G01S 3/38* | (2006.01) | |
| *G01S 3/36* | (2006.01) | |

(Continued)

(52) U.S. Cl.
CPC .................. *G01S 3/06* (2013.01); *H01Q 3/36* (2013.01); *G01S 3/043* (2013.01); *G01S 3/26* (2013.01); *G01S 3/36* (2013.01); *G01S 3/38* (2013.01); *G01S 3/48* (2013.01); *H01Q 21/06* (2013.01)

(58) Field of Classification Search
CPC ... G01S 3/06; G01S 3/043; G01S 3/48; G01S 3/36; G01S 3/38; G01S 3/26; H01Q 21/06; H01Q 21/00

USPC ................................ 342/442, 372, 359, 422
See application file for complete search history.

(56) References Cited

U.S. PATENT DOCUMENTS 2,547,622 A * 4/1951 Cleaver ..................... G01S 3/14
                                                            342/441
2,860,336 A * 11/1958 Earp ......................... G01S 3/54
                                                            342/429

(Continued)

FOREIGN PATENT DOCUMENTS

| DE | 102013226988 A1 | 6/2015 |
| FR | 2936382 A1 | 3/2010 |
| GB | 2243041 A | 10/1991 |

OTHER PUBLICATIONS

Extended European Search Report dated Jan. 25, 2017, issued in priority European Application No. 16184891.6, filed Aug. 19, 2016, 9 pages.

*Primary Examiner* — Chuong P Nguyen
(74) *Attorney, Agent, or Firm* — Christensen O'Connor Johnson Kindness PLLC

(57) ABSTRACT

A method for direction finding of at least one incoming signal with a direction finding antenna unit is described, the direction finding antenna unit comprising at least an antenna system having several antenna elements. One antenna element is used as a reference antenna element. A subset of the several antenna elements is selected when the reference antenna element detects the incoming signal, the selected subset ensuring the best signal-to-noise ratio of all possible subsets of the several antenna elements with respect to the reference antenna element. Phase difference and orientation of the incoming signal are related to the reference antenna element. Further, a direction finding antenna unit is described.

14 Claims, 2 Drawing Sheets

(51) Int. Cl.
*G01S 3/26* (2006.01)
*G01S 3/48* (2006.01)
*H01Q 21/06* (2006.01)

(56) References Cited

U.S. PATENT DOCUMENTS

| | | | | |
|---|---|---|---|---|
| 4,313,117 A * | 1/1982 | Lipsky | ............... | G01S 3/32 |
| | | | | 342/437 |
| 4,639,733 A * | 1/1987 | King | ............... | G01S 3/48 |
| | | | | 342/417 |
| 5,237,336 A * | 8/1993 | Jelloul | ............... | H01Q 21/14 |
| | | | | 343/799 |
| 6,184,828 B1 * | 2/2001 | Shoki | ............... | H01Q 3/26 |
| | | | | 342/372 |
| 6,600,456 B2 * | 7/2003 | Gothard | ............... | H01Q 1/246 |
| | | | | 342/372 |
| 6,606,058 B1 * | 8/2003 | Bonek | ............... | H01Q 3/26 |
| | | | | 342/367 |
| 6,768,456 B1 * | 7/2004 | Lalezari | ............... | G01S 13/48 |
| | | | | 342/373 |
| 6,864,852 B2 * | 3/2005 | Chiang | ............... | H01Q 1/246 |
| | | | | 343/810 |
| 7,088,306 B2 * | 8/2006 | Chiang | ............... | H01Q 1/246 |
| | | | | 343/817 |
| 7,612,715 B2 * | 11/2009 | Macleod | ............... | G01S 3/043 |
| | | | | 342/432 |
| 9,219,307 B2 * | 12/2015 | Takahashi | ............... | G01S 3/38 |
| 10,433,274 B2 * | 10/2019 | Jamieson | | |
| 2002/0008672 A1 * | 1/2002 | Gothard | ............... | H01Q 1/246 |
| | | | | 343/893 |
| 2006/0158375 A1 * | 7/2006 | Macleod | ............... | G01S 3/043 |
| | | | | 342/417 |
| 2018/0024220 A1 * | 1/2018 | Massarella | ............... | G01S 3/043 |
| | | | | 342/417 |
| 2018/0031689 A1 * | 2/2018 | Ben-Ari | ............... | G01S 13/4454 |
| 2018/0358696 A1 * | 12/2018 | Shapoury | ............... | H01Q 21/0025 |

* cited by examiner

METHOD FOR DIRECTION FINDING AND DIRECTION FINDING ANTENNA UNIT

FIELD OF THE DISCLOSURE

Embodiments of the present disclosure relate generally to a method for direction finding as well as a direction finding antenna unit.

BACKGROUND

Direction finding is the measurement of direction of incoming signals received by a direction finding antenna unit, for instance radio or other electromagnetic waves.

Generally, the direction finding antenna unit comprises an antenna system which has several antenna elements for receiving the incoming signals. For instance, the several antenna elements are formed in a circular array. It is known that in certain frequency ranges, the antenna elements have undirected directional characteristics (also called non directional characteristics) when they are considered in isolation. In order to address this problem, one antenna element of the several antenna elements is used as a reference antenna element. Then, the phase difference and the orientation, in particular azimuth and elevation, are related to this reference antenna element during direction finding. However, the receiving characteristics of the whole antenna system may be restricted due to the directional characteristics of the antenna elements in certain frequency ranges. For instance, the antenna beam of the reference antenna element is disturbed by antenna beams of the other antenna elements. Thus, the level of the incoming signals and the signal-to-noise ratio heavily depend on the incident angle as well as the frequency of the incoming signals. In worst case, weak signals cannot be detected and processed by the direction finding antenna unit due to the restricted receiving characteristics of the whole antenna system.

In the state of the art, this problem is addressed by a separate antenna element used as the reference antenna element which is disposed in a certain distance to the antenna system such that the antenna elements of the antenna system do not disturb the receiving characteristics of the reference antenna element. However, the size of such a direction finding antenna unit is large due to the separate reference antenna element.

Despite this, it is known in the prior art to select several antennas of an antenna system due to shadowing effects while only taking the signal strength of the incoming signal at each antenna into account. For instance, DE 10 2013 226 988 A1 shows such a system.

FR 2 936 382 A1 discloses a method for identifying several emitters wherein the signals received are grouped accordingly.

U.S. Pat. No. 4,313,117 describes a system having several fixed antenna pairs wherein a control unit selects the antenna pairs receiving the signals with the highest signal strength for further processing.

SUMMARY

Embodiments of the present disclosure provide a method for direction finding of at least one incoming signal with a direction finding antenna unit comprising at least an antenna system having several antenna elements, one antenna element being used as a reference antenna element, a subset of the several antenna elements being selected when the reference antenna element detects the incoming signal, the selected subset ensuring the best signal-to-noise ratio of all possible subsets of the several antenna elements with respect to the reference antenna element, phase difference and orientation of the incoming signal being related to the reference antenna element.

Further, a directional finding antenna unit comprising at least an antenna system and a control unit which is connected to the antenna system comprising several antenna elements, one of the several antenna elements being a reference antenna element for detecting a signal, the control unit being configured to select a subset of the several antenna elements such that the selected subset has the best signal-to-noise ratio of all possible subsets of the several antenna elements.

Embodiments of the present disclosure are based on the finding that no separate reference antenna element will be necessary if it is ensured that the used reference antenna element is not disturbed by the other antenna elements. Accordingly, only a subset of all possible antenna elements is used for direction finding wherein the number of antenna elements as well as the question which antenna elements are used depends inter alia on the used reference antenna element. Hence, a subset is selected which ensures the minimal disturbance of the reference antenna element. By this, the level of the incoming signals and the signal-to-noise ratio of these incoming signals are independent of the frequency and the incident angle of the incoming signals. In general, the level of the incoming signals and the signal-to-noise ratio of these incoming signals have the same value independently of the frequency and the incident angle of these incoming signals. Therefore, a compact antenna system as well as a compact direction finding antenna unit are established which ensure the best receiving characteristics of the direction finding antenna unit, in particular the antenna system. Since only a subset of all antenna elements of the antenna system is used, the measuring vector has a smaller dimension than it might have.

The antenna elements of the subset and the reference antenna element receive the at least one incoming signal simultaneously. For direction finding purposes, phase difference and orientation of the incoming signal received by the antenna elements of the subset are each referred to the incoming signal received by the reference antenna element. For instance, two antenna elements of the several antenna elements are selected for being the subset wherein a third antenna element is the reference antenna element. Then, the incoming signal received by the first antenna element and the third antenna element (reference antenna element) are brought in relation to each other in order to determine the phase difference and orientation, namely azimuth and elevation, of the incoming signal. The same applies for the incoming signal received by the second antenna element and the third antenna element (reference antenna element) which are also brought in relation to each other in order to determine the phase difference and orientation, namely azimuth and elevation, of the incoming signal.

In case that more than two antenna elements are used for the subset, the incoming signal received by the additional antenna elements of the subset are also brought in relation to the incoming signal received by the reference antenna element in order to determine phase difference and orientation appropriately.

As the subset has been selected such that the best signal-to-noise ratio of all possible subsets of the several antenna elements with respect to the reference antenna element is ensured, direction finding of weak signals is possible while using a compact directional finding antenna unit.

According to an aspect, the antenna system is connected to an input of the receiver, the received signals of the antenna elements of the selected subset being summed up before the input. The received signals are summed up in an analog manner since they are summed up before the input of the receiver, in particular a digital receiver. Accordingly, the received signals are summed up without any pre-processing which might result in losses, in particular a digitalization. Further, a more simple receiver can be used which is less expensive.

The received signals of the antenna elements of the selected subset may be summed up in a switching matrix, the switching matrix being connected to the antenna system. The switching matrix can be used to combine the different received signals to combined signals, for instance. Thus, the received signals may be summed up in the switching matrix in an analog manner. The switching matrix is arranged between the antenna system and the receiver, in particular the input of the receiver.

Further, the phase of at least one antenna element of the selected subset is shifted, in particular before the input of the receiver. The phase of one signal or a combined signal of several received signals is shifted in order to obtain a better directivity of the direction finding antenna unit.

According to an embodiment, the several antenna elements are orientated such that the antenna system is a circular array. Such an orientation ensures good directional measurements and, thus, locating of the emitter of the received signals. In general, the receiving characteristics of such a formation are constant even though the array is used for directional finding over 360° since the array has the same aperture for each azimuthal incident angle of the incoming signals. Such a formation is also called ring array.

According to another embodiment, the several antenna elements can be orientated such that the antenna system has an L-shaped array. Hence, a planar array formation may also be used.

In general, the several antenna elements of the antenna system can be orientated such that they fit the requirements of the intended application.

According to another aspect, the one antenna element used as reference antenna element has been selected. Thus, this antenna element is not fixedly predetermined as it will be selected during the direction finding.

The selection can be done automatically. For instance, the control unit is configured to automatically select one of the several antenna elements as the reference antenna element.

Alternatively, the one antenna element used as reference antenna element is predetermined at least according to the intended application and operation mode, respectively.

Regarding the direction finding antenna unit, a receiver is provided, the antenna system being connected to an input of the receiver, the control unit being configured such that the signals of the antenna elements of the selected subset are summed up before the input, in particular in a switching matrix. Accordingly, the control unit comprises inter alia the function of the switching matrix.

The control unit can further be configured such that the phase of at least one signal is shifted which is received by at least one antenna element of the selected subset. Accordingly, the control unit can also comprise the function of a phase shifter. As already mentioned, the directivity of the direction finding antenna unit may be improved by the phase shifting.

Alternatively, the switching matrix and/or the phase shifter are separate components with respect to the control unit.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawing, wherein FIG. 1 schematically shows a direction finding antenna unit according to an embodiment of the present disclosure.

DETAILED DESCRIPTION

The detailed description set forth below in connection with the appended drawing, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In the following description, numerous specific details are set forth in order to provide a thorough understanding of one or more embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Figure 1:
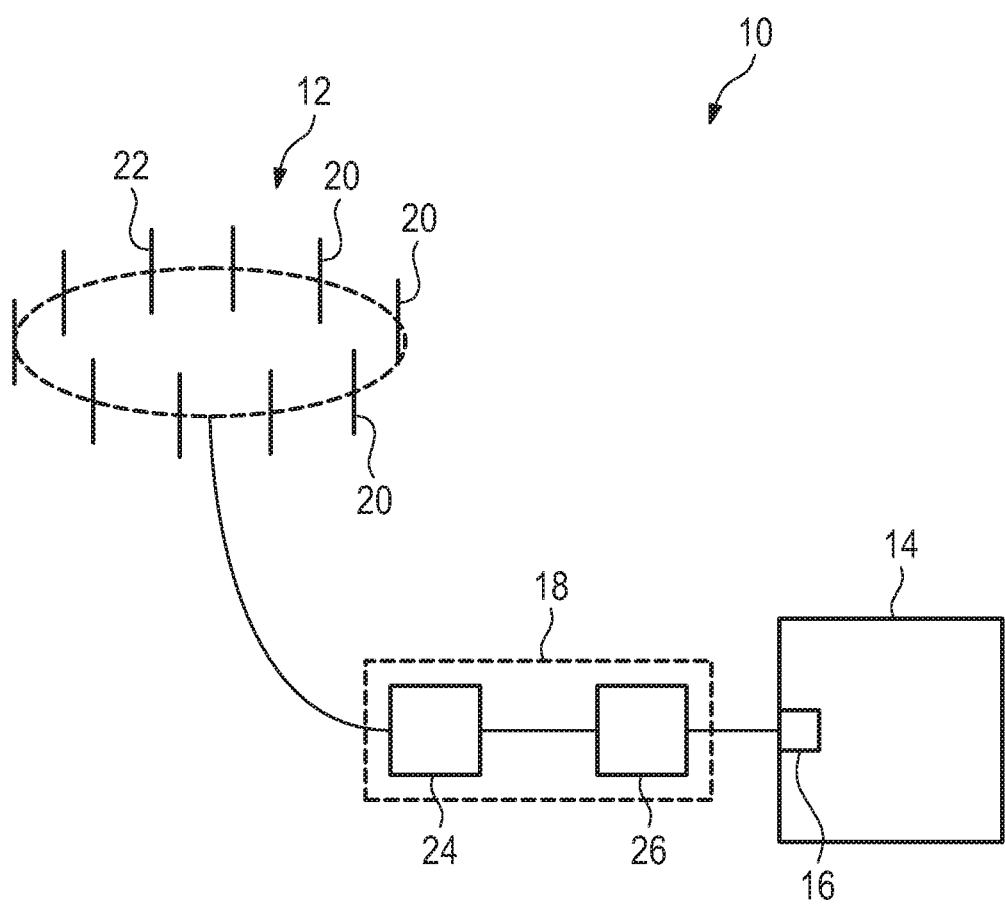

In FIG. 1, a direction finding antenna unit 10 is schematically shown which comprises an antenna system 12 and a receiver 14 having an input 16. The antenna system 12 is connected to the input 16 of the receiver 14.

As shown in FIG. 1, a control unit 18 is provided which is arranged between the antenna system 12 and the receiver 14 wherein the control unit 18 can control the antenna system 12 as will be described later. Further, the control unit 18 has several further functions which will also be described later, particularly with respect to FIG. 2.

In the shown embodiment, the antenna system 12 comprises ten antenna elements 20 which are used for direction finding of incoming signals. However, the antenna system 12 can comprise more or less antenna elements 20 depending on the intended usage.

The control unit 18 is configured such that one of the several antenna elements 20 is selected as a reference antenna element 22 for detecting an incoming signal.

If the reference antenna element 22 detects an incoming signal, the control unit 18 will calculate which subset of the several antenna elements 20 ensures the best signal-to-noise ratio with respect to all possible subsets of the several antenna elements 20. This means that the control unit 18 calculates which antenna elements 20 shall be used for direction finding with respect to the used reference antenna element 22 wherein the selection ensures the minimum disturbance of the reference antenna element 22, in particular of its receiving characteristics.

After this calculation, the control unit 18 controls the antenna system 12 such that the most promising subset is used for direction finding ensuring that low level incoming signals can be detected. Further, incoming signals having a frequency less than 1 GHz can be detected and processed easily.

In the control unit 18 the received signals of the antenna elements 20 of the selected subset are summed up. Since the control unit 18 is connected to the input 16 of the receiver 14, the received signals of the selected subset are summed up in an analog manner. The control unit 18 comprises a switching matrix 24 which can be used for summing up the received signals in an analog manner. Moreover, the switching matrix 24 can be used for ensuring that more antenna elements 20 can be used than the number of intersection processing channels are provided in the receiver 14. Accordingly, the switching matrix 24 can combine the received signals.

Alternatively, the switching matrix 24 may be separately formed with respect to the control unit 18.

Further, the phase of at least one received signal can be shifted in a phase shifter 26. Moreover, several received signals can be combined and, then, the phase of the combined signal is shifted in the phase shifter 26. The several received signals may be combined in the switching matrix 24, previously. In general, the phase shifting improves the directivity of the direction finding antenna unit 10 as well as the directivity of the method for direction finding.

As shown in the embodiment of FIG. 1, the phase shifter 26 is integrated in the control unit 18. However, the phase shifter 26 can also be formed separately with respect to the control unit 18.

In the shown embodiment, the several antenna elements 20 are orientated such that the antenna system 12 is a circular array. However, according to another embodiment, the several antenna elements 20 can be orientated such that the antenna system 12 is an L-shaped array, in particular a planar one.

In general, the formation of the several antenna elements 20 is chosen such that the best characteristics are guaranteed regarding the requirements of the intended usage of the direction finding antenna unit 10. For instance, the usage on a plane, car, ship or satellite has different requirements regarding the receiving characteristics and, thus, regarding the formation of the several antenna elements 20. Accordingly, the formation of the several antenna elements 20 will be adapted to these requirements.

Figure 2:
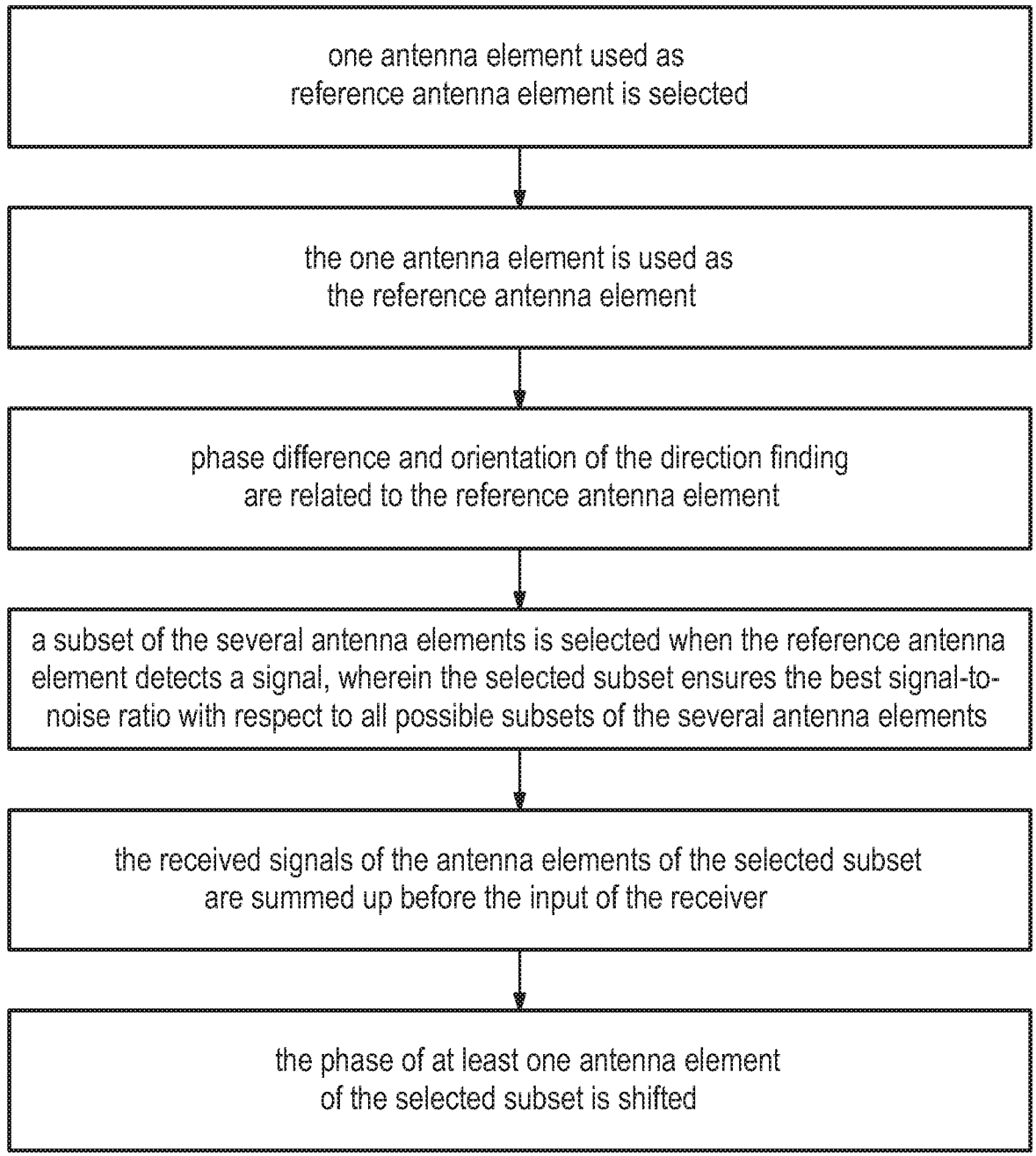
FIG. 2 shows a flow-chart representing a method for direction finding according to an embodiment of the present disclosure.

With respect to FIG. 2, the control unit 18 may determine one antenna element 20 to be used as the reference antenna element 22 of the whole antenna system 12 in a first step. Alternatively, the reference antenna element 22 is predetermined due to the operation mode or the application of the direction finding antenna unit 10.

Accordingly, the phase difference and orientation of the direction finding, in particular the incoming signals, are related to the selected reference antenna element 22.

Afterwards, a subset of the remaining antenna elements 20 is selected when the reference antenna element 22 detects a signal. The subset is selected such that the best signal-to-noise ratio with respect to all possible subsets of the several antenna elements 20 is ensured. This means that the subset is selected such that the reference antenna element 22 is disturbed minimally by the antenna elements 20 of the selected subset. In a first approximation step, the antenna elements 20 directly neighbored to the used reference antenna element 22 are switched off, for instance.

The selection can be provided by the control unit 18 which calculates the signal-to-noise ratio for all possible subsets of the several antenna elements 20 with respect to the used reference antenna element 22.

Further, the incoming signals of the selected subset are summed up before the receiver 14. This can be done by the switching matrix 24 which might be a part of the control unit 18.

In addition, the phase of at least one received signal or a combined signal of several received signals can be shifted by the phase shifter 26 which might also be a part of the control unit 18.

As already stated, the switching matrix 24 as well as the phase shifter 26 can be formed separately with respect to the control unit 18. However, it is ensured that analog signals are summed up and their phases are shifted in an analog manner since the switching matrix 24 and the phase shifter 26 are arranged before the input 16 of the receiver 14.

In general, the receiver 14 and the control unit 18 might interact such that the control unit 18 controls the antenna system 12, the switching matrix 24 and the phase shifter 26 in accordance with an output of the receiver 14.

Accordingly, a compact direction finding antenna unit 10 is ensured which has improved receiving characteristics.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method for direction finding of at least one incoming signal with a direction finding antenna unit comprising at least an antenna system having several antenna elements, with the following steps:
   using one antenna element of said several antenna elements as a reference antenna element; and
   selecting a subset of said several antenna elements when said reference antenna element detects said incoming signal, said selected subset ensuring the best signal-to-noise ratio of all possible subsets of said several antenna elements with respect to said reference antenna element,
   wherein phase difference and orientation of said incoming signal related to said reference antenna element, and wherein the selected subset of said several antenna elements provides a minimum disturbance of the receiving characteristics of said reference antenna element to ensure the best signal-to-noise ratio.

2. The method according to claim 1, wherein said antenna system is connected to an input of a receiver, said received signals of said antenna elements of said selected subset being summed up before said input of said receiver.

3. The method according to claim 1, wherein said received signals of said antenna elements of said selected subset are summed up in a switching matrix, said switching matrix being connected to said antenna system.

4. The method according to claim 1, wherein the phase of at least one antenna element of said selected subset is shifted, in particular before said input of said receiver.

5. The method according to claim 1, wherein said several antenna elements are orientated such that said antenna system is a circular array.

6. The method according to claim 1, wherein said several antenna elements are orientated such that said antenna system is an L-shaped array.

7. The method according to claim 1, wherein the one antenna element used as reference antenna element has been selected.

8. The method according to claim 7, wherein the selection is done automatically.

9. A direction finding antenna unit comprising at least an antenna system and a control unit which is connected to said antenna system which comprises several antenna elements, one of said several antenna elements being a reference antenna element for detecting a signal, said control unit being configured to select a subset of said several antenna elements when said reference antenna element detects an incoming signal, such that said selected subset has the best signal-to-noise ratio of all possible subsets of said several antenna elements with respect to said reference antenna element and such that the selected subset of said several antenna elements provides a minimum disturbance of said reference antenna element to ensure the best signal-to-noise ratio, wherein phase difference and orientation of said incoming signal are related to said reference antenna element.

10. The direction finding antenna unit according to claim 9, wherein a receiver is provided, said antenna system being connected to an input of said receiver, said control unit being configured such that the signals of said antenna elements of said selected subset are summed up before said input, in particular in a switching matrix.

11. The direction finding antenna unit according to claim 9, wherein said control unit is configured such that the phase of a signal is shifted which is received by at least one antenna element of said selected subset.

12. The direction finding antenna unit according to claim 9, wherein said several antenna elements are orientated such that said antenna system is a circular array.

13. The direction finding antenna unit according to claim 9, wherein said several antenna elements are orientated such that said antenna system is an L-shaped array.

14. The direction finding antenna unit according to claim 9, wherein said control unit is configured such that the one antenna element used as reference antenna element is selected.

* * * * *